B. D. CHAMBERLIN.
PHOTOGRAPHIC FILM SPOOL.
APPLICATION FILED JUNE 15, 1917.
1,306,881. Patented June 17, 1919.
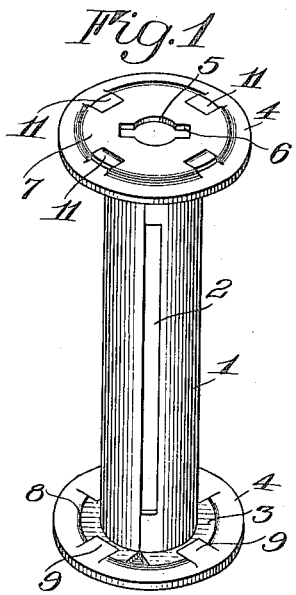
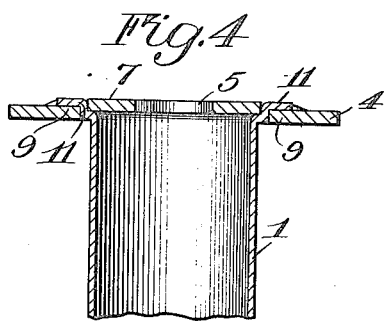
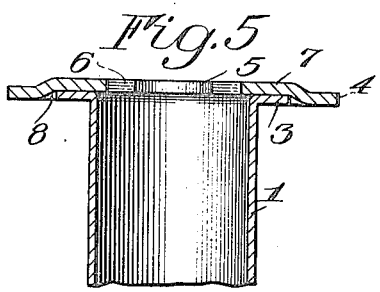
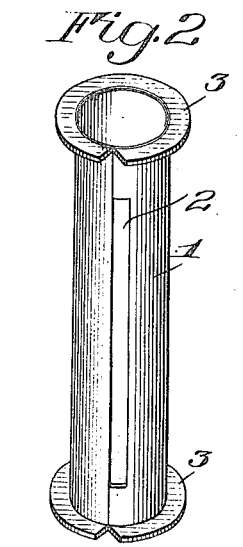
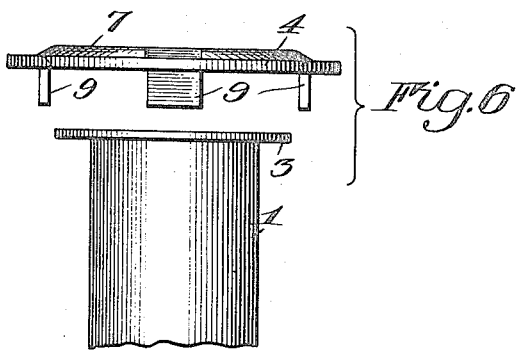
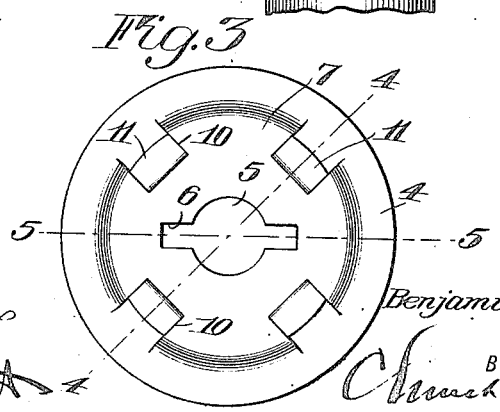
WITNESSES:
Nelson H. Copp
INVENTOR
Benjamin D. Chamberlin
BY
his ATTORNEYS

UNITED STATES PATENT OFFICE.

BENJAMIN DAY CHAMBERLIN, OF ROCHESTER, NEW YORK, ASSIGNOR TO EASTMAN KODAK COMPANY, OF ROCHESTER, NEW YORK, A CORPORATION OF NEW YORK.

PHOTOGRAPHIC-FILM SPOOL.

1,306,881.  Specification of Letters Patent.  Patented June 17, 1919.

Application filed June 15, 1917. Serial No. 175,029.

*To all whom it may concern:*

Be it known that I, BENJAMIN D. CHAMBERLIN, of Rochester, in the county of Monroe and State of New York, have invented certain new and useful Improvements in Photographic-Film Spools; and I do hereby declare the following to be a full, clear, and exact description of the same, reference being had to the accompanying drawings, forming part of this specification, and to the reference-numerals marked thereon.

My present invention relates to photography and more particularly to photographic film cartridges and it has for its object to provide a light, cheap and efficient film spool or center upon which the film strip is wound. The invention contemplates a spool of sheet metal construction and one of the improvements has reference to making the end flanges that abut and cover the ends of the film roll light-tight so that the wound film cannot be fogged by leakage of light at these points. To these and other ends the invention resides in certain improvements and combinations of parts, all as will be hereinafter more fully described, the novel features being pointed out in the claims at the end of the specification.

In the drawings:

Figure 1 is a perspective view of a spool constructed in accordance with and illustrating one embodiment of my invention;

Fig. 2 is a perspective view of the spool center or core;

Fig. 3 is an enlarged end view of the spool;

Fig. 4 is a fragmentary section on the line 4—4 of Fig. 3;

Fig. 5 is a fragmentary section on the line 5—5 of Fig. 3, and

Fig. 6 is a collective view, enlarged, of one end of the core and the adjacent end flange or disk illustrating the manner in which these elements go together.

Similar reference numerals throughout the several views indicate the same parts.

As before indicated, the spool is made entirely of sheet metal and comprises a cylindrical tubular core piece or center 1 formed by rolling a metal sheet having an elongated notch 2 at one edge which, when brought into abutment with the opposite edge, provides a slot in the core for the attachment of the inner end of the strip that is to be wound thereon. At the ends of the core 1 are narrow lateral flanges 3 and applied against these flanges are sheet metal disks 4 that constitute the end flanges of the spool. Said disks have central openings 5 to receive the spool centers of a camera upon which the spool is rotatably supported and one of these openings is, as usual, provided with irregular extensions 6 for the engagement of a winding key. The core 1 being tubular, the portion of the key that projects through the disk is received therein.

Each disk 4 has its central portion formed out into a boss 7 that provides a concentric shallow recess 8 on the inner side of the disk and this recess is of just sufficient diameter and depth to accommodate the flanges 3 of the core in the plane of the rim of the disk, as clearly shown in Fig. 5. At intervals around the periphery of the boss 7 attaching ears 9 are punched out of the material of the disk inwardly to embrace the flanged end 3 of the core. The openings 10 that are left by the punching out of these ears lie between the latter and the center of the disk and are intersected and partially closed by the flange 3 of the core. After the parts are assembled as shown in Fig. 6, these attaching ears 9 are clenched over on the inner side of the flange 3 as shown in Fig. 1 and are forced back into the plane of the disk 4 so that separated portions of the flange 3 are displaced as shown at 11 in Fig. 4 and securely interlocked with the disk in the openings 10. The latter are thereby completely closed against the entrance of light, the ears 9 being forced back into substantially their original positions and the disk and core are thereby firmly attached together.

This interlocking of the elements not only makes the spool light-tight at the ends but takes care of the strain imposed through turning the core by means of a winding key applied to the disk. Because of the flanged and embossed construction, very light sheet metal may be used and yet produce a light and rigid spool.

I claim as my invention:

1. A photographic film spool comprising a tubular core having end flanges and relatively fixed disks disposed against the flanged ends of the core and provided with attaching ears struck out from the material of the disks and clenched against the flanges.

2. A photographic film spool comprising a tubular core having end flanges and relatively fixed disks disposed against the flanged ends of the core and having depressed portions for receiving the latter, said disks being further provided with attaching ears struck out from the material thereof at the margins of the depressed portions and clenched against the flanges.

3. A photographic film spool comprising a tubular core having end flanges and disks disposed against the flanged ends of the core and having depressed portions for receiving the latter, said disks being further provided with attaching ears struck out from the material thereof and clenched against the flanges, and the latter being offset at intervals into the openings in the disk that are formed by punching out the ears.

BENJAMIN DAY CHAMBERLIN.